J. W. FORD.
TARE WEIGHT.
APPLICATION FILED APR. 30, 1907.

928,745.

Patented July 20, 1909.
2 SHEETS—SHEET 1.

Witnesses
Oliver W. Holmes
E. B. McBath

Inventor
John W. Ford,
By O'Meara Buck
Attorneys

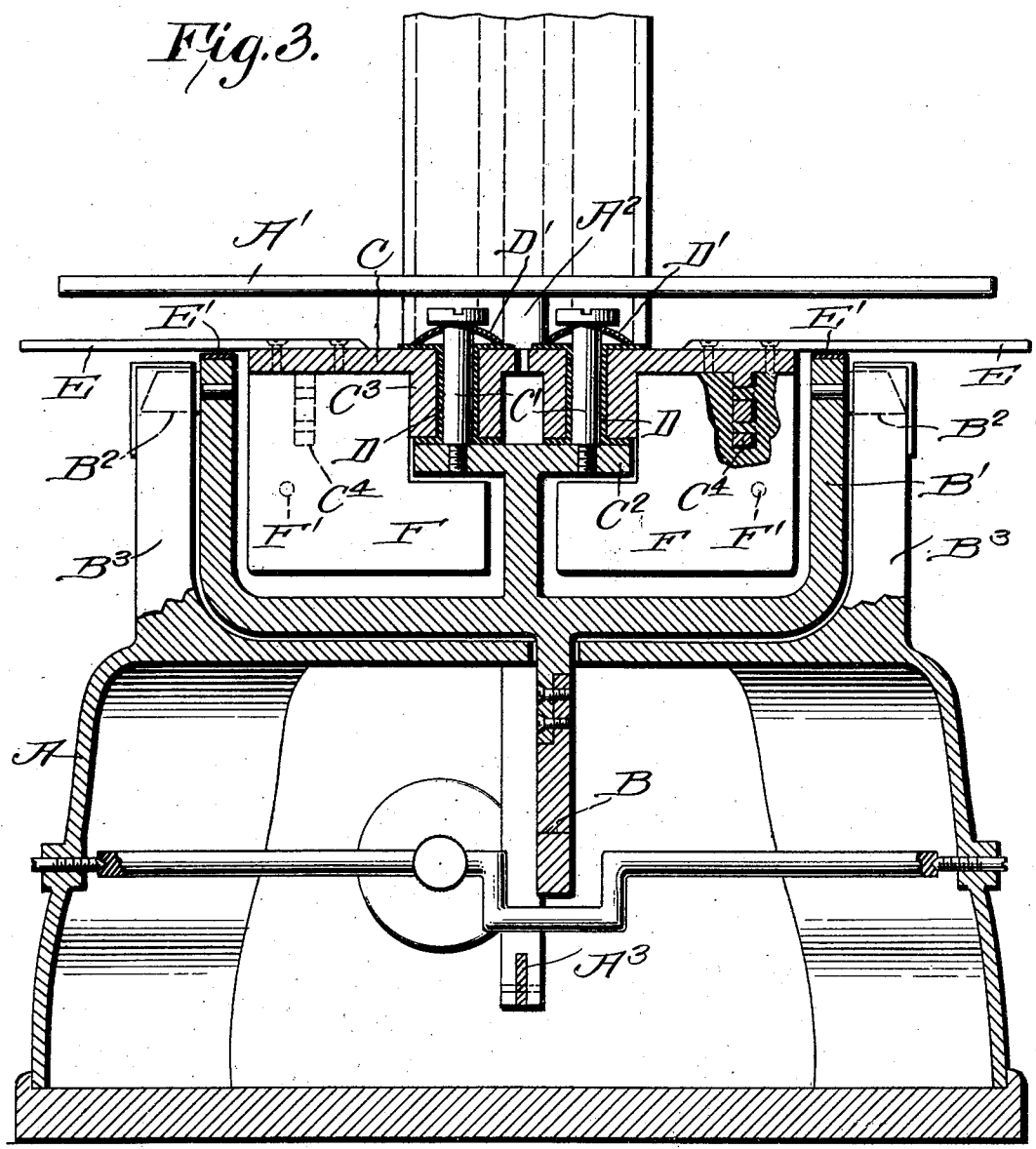

UNITED STATES PATENT OFFICE.

JOHN W. FORD, OF ALTON, ILLINOIS, ASSIGNOR TO AUTOMATIC SCALE COMPANY, OF ALTON, ILLINOIS, A CORPORATION OF ILLINOIS.

TARE-WEIGHT.

No. 928,745.      Specification of Letters Patent.      Patented July 20, 1909.

Application filed April 30, 1907. Serial No. 371,179.

*To all whom it may concern:*

Be it known that I, JOHN W. FORD, a citizen of the United States, residing at Alton, in the county of Madison and State of Illinois, have invented a new and useful Improvement in Tare-Weights, of which the following is a specification.

This invention relates to a tare weight designed to be used in connection with computing scales and especially in connection with a scale such as is shown in my application executed February 18, 1907, and having Serial Number 361,302, and in the application executed upon the same date and having Serial Number 361,539, and to which reference is had for parts of the scale not shown herein.

The object of this tare weight is to serve as an adjustable counter-weight for any article placed upon the scale platform and not to be included in the selling weight, as for example, lard pails, dishes into which butter is to be placed or any receptacle which it is customary to place upon a scale to receive merchandise to be weighed and sold. It is the ordinary custom to weigh such receptacles and then add to the predetermined weight of the receptacle to the weight of the article to be placed in it to secure the total weight, or to secure the total weight and then deduct the weight of the receptacle to secure the actual net weight of the article sold, a matter of some difficulty and one in which errors can be readily made where both the amounts involve pounds, ounces and fractions of ounces.

The object of my invention is a tare weight rotatable by means of a handle traveling over a graduated scale so constructed and arranged that when the handle is moved along the scale to a mark having a value equal to the weight of the vessel, it will cause the tare weight to balance the weight of the vessel, thus returning the indicator hand to zero, so that when the article to be weighed is placed in the receptacle the indicator hand will give the net weight.

Figure 1:
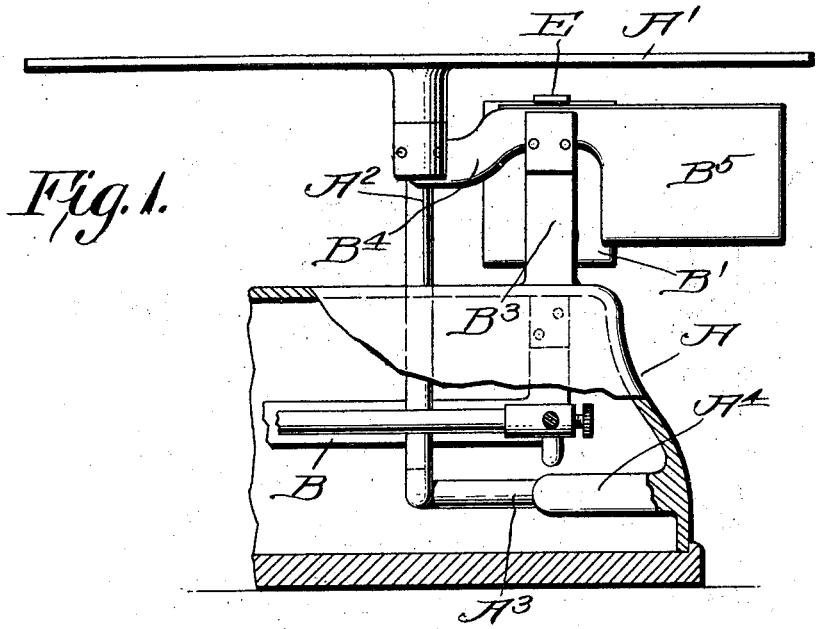
Figure 2:
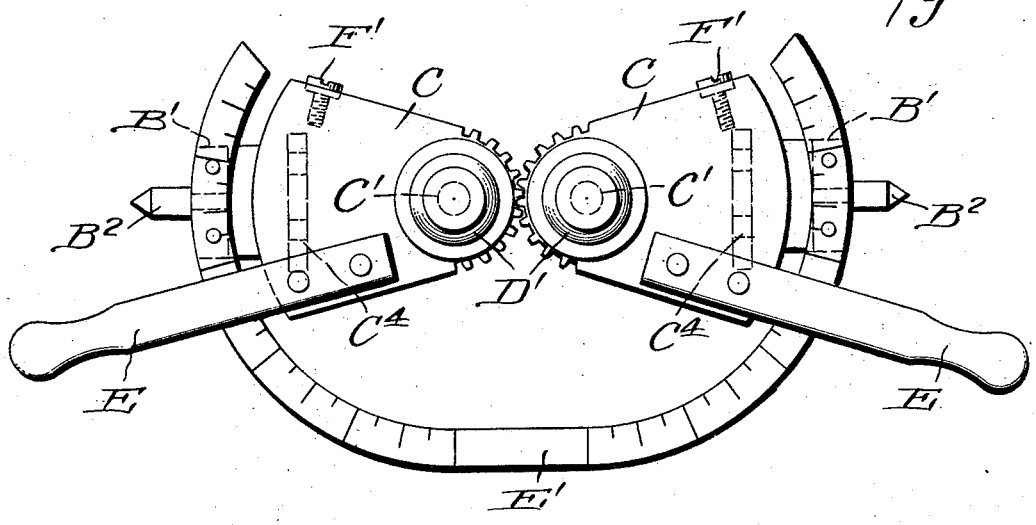

In the accompanying drawings, Figure 1 is a side elevation of the platform end portion of a computing scale, showing my tare weight applied thereto. Fig. 2 is a plan view of the tare weight mechanism removed from the scale. Fig. 3 is a transverse section through the platform end portion of the scale and through the tare weight mechanism, the scale beam being shown in section and the platform being shown in edge elevation.

In these drawings A represents the housing for the scale beam and A' the scale platform which is provided with a standard $A^2$ the lower end of which is connected to a link $A^3$ pivoted to a bracket $A^4$.

B represents a scale beam which is connected to a tare weight casing B' which is provided with projecting knife edges $B^2$, upon its opposite sides which are mounted in suitable standards $B^3$, said tare weight casing being connected pivotally with the platform by means of the arms $B^4$, and a counterbalance $B^5$ for the platform is also connected with the arms, casing and consequently with the scale-beam, so that all of said parts will move together. With the exception of the tare weight casing B' these parts are shown only to make clear the construction and operation of the tare weight to be now described.

The tare weight consists of two gear segments C meshing with each other and mounted upon suitable screw shafts C' the threaded portions of which thread into a suitable plate $C^2$ carried by the central portion of the tare weight casing B'. These shafts are provided with bushings D, the lower ends of which are flanged to form washers for bosses $C^3$ formed upon the inner ends of the segment C which bosses receive the bushings D and form bearings upon which segments are mounted and spring washers D' are fitted between the heads of the screws and the upper faces of the segments. The segments are rotated upon the screws or shafts C' by handles E which move over a graduated scale E', formed on the upper edge of a tare weight casing B' and laid off in ounces and pounds. The tare weights proper are formed of lead and are secured upon the under sides of the segments C, as shown at F being held in place by depending lugs $C^4$ carried by the segments and perforated so that the lead will flow into the perforations thereby more securely holding the same in place. In adjacent faces of these weights F, are adjustable screws F' which not only serve to regulate the normal position of said weights but also prevent injury to the lead faces of the weights when they are brought together. I have shown and described two segments, two weights and two handles which are arranged upon opposite sides of the scale, and as the segments mesh with each other, it will be obvious that it is only necessary to move one handle to rotate both weights and therefore, it will be obvious that the tare weight mechanism can be operated from either side of a counter. The spring washers D' serve as tension devices to hold the tare weight in its adjusted position.

The operation of the device is as follows:—The tare weights normally lie in such position that the dial hand indicates zero and when any receptacle such as a pail or dish is placed upon the scale platform the indicator hand of the dial, not shown in this application, will at once indicate the weight of such receptacle which we may say is one pound. One of the handles is then moved over the graduated scale E' to the one pound mark, thus partially rotating both segments and both weights and when the said handle reaches the one pound mark it exactly counter-balances the weight of the receptacle and the indicator hand returns to zero. The material may then be placed in the receptacle and the indicator hand will give the net weight.

Having thus fully described my invention, what I claim as new and desire to secure by Letters Patent, is:—

1. The combination with a computing scale, a scale beam a tare weight casing connected to the scale beam and with the platform, intermeshing segments, the longitudinal axes of said segments normally lying in alinement with the pivotal points, weights carried by said plates and means for swinging said plates upon their pivot points.

2. The combination with a computing scale of a tare weight casing, the upper edge of said casing having a scale formed thereon, segmental plates pivotally mounted adjacent their inner ends upon an upwardly projecting portion of the casing, the inner ends of said segments being provided with intermeshing gear teeth, weights carried by said segments and handles carried by the segments, traveling over the scale.

3. The combination with a counter-balanced platform, of tare weights adapted to balance the weight of an article placed upon said platform when said weights are rotated, means for simultaneously rotating both weights and means for holding said weights in their adjusted position.

4. The combination with a computing scale, of tare weights eccentrically pivoted, said weights being provided with intermeshing gears, a graduated scale for use with each weight, a handle carried by each weight and movable upon the scale, means for supporting the scale platform, a casing containing said weights and carrying said graduated scale, the platform supporting means being connected to said casing and a scale beam connected to said casing, all as and for the purpose set forth.

5. In a scale of the kind described, the combination with the platform and scale beam, of a casing connected with the scale beam, said casing being pivotally mounted, and operatively connected with the platform, the tare weights pivotally mounted in the casing and adapted to move in unison, each weight being provided with a handle, and a graduated scale carried by the casing and over which the handles are adapted to move.

JOHN W. FORD.

Witnesses:
WM. P. BOYNTON,
E. G. MERIWETHER.